United States Patent Office 2,841,496
Patented July 1, 1958

2,841,496

DUSTLESS MEAL AND METHOD OF PREPARING THE SAME

Earl H. Brockman, Caldwell, Idaho, assignor of one-third to Pauline Brockman, Caldwell, Idaho No Drawing. Application March 12, 1956
Serial No. 570,674

12 Claims. (Cl. 99—2)

This invention relates to a composite product, preferably utilizable in ground form and to the relatively simple method of preparing the product. For some years past agricultural products have been subjected to intensive analysis, experimentation and study in order to determine the nutritive properties of products used as feed for livestock, poultry and, to some extent, humans. It has been found that many agricultural products have greatly improved nutritive value when the products are dehydrated under controlled conditions and are thereafter ground or otherwise comminuted to produce meals which may be used alone or mixed with supplementary or complementary feeds. "Dehydrated" includes material dried or cured by any known method such as sun-curing, shade-curing, artificial methods, or any combination thereof. Certain agricultural plants which may be designated as "forage" crops have been used as animal and poultry feeds after dehydration and grinding. Such forage crops include alfalfa, various clovers, various lespedezas, various grasses and hay crops, fodder such as corn fodder, sorghum fodder and the foliage of certain plants such as peas, soybeans, peanuts and the like.

This is a continuation-in-part of my earlier copending application Serial Number 305,075, filed August 18, 1952, and now abandoned.

While each of these forage materials has certain nutritive properties which are characteristic of the particular plant, yet which differ from plant to plant, all of the materials have a common undesirable quality. After dehydration the grinding of the material is invariably attended with the creation of a fairly substantial amount of dust. This not only creates a hazard from dust explosion during the grinding and elevation to the storage bins but moreover the dust itself is both a nuisance and a health hazard to the animals, birds, or humans exposed to the dust. Moreover, when the ground meal is placed before an animal, for example, the larger particles are generally first consumed leaving the dust to collect at the bottom of feed bins or troughs where it is generally wasted. Thus, the loss from dust occurs both in the grinding of the meal and in its subsequent utilization as a feed.

To a large extent the same disadvantageous loss from dust occurs during and after grinding of certain food products made from grinding small grains such as wheat, corn, barley, rice, oats and the like, and ground supplementary compositions of animal and mineral origin such as blood tankage, dried animal and bird meal, bone dust, powdered phosphate rock, ground lime stone and the like. Thus the process of this invention is useful for grinding solid, normally dust-forming materials while reducing dust formation and yielding a non-dusting product.

Attempts have been made to lessen the dust formation resulting after the grinding of forage feeds and small grains by the later addition of oil to the ground meal. Such attempts have not been attended with the desired success because of the difficulty of accomplishing uniform wetting of the ground and comminuted meal without using excessive quantities of oil and intensive and expensive agitation in an effort to admix the oil with the meal. Even so the addition of the oil to the ground meal does not eliminate the dust loss which occurs during the original grinding of the dried forage.

It has been discovered that the disadvantages of prior practices may be readily overcome by a relatively simple process in accordance with the teachings of the present invention. I have discovered that by adding desired amounts of an oil-bearing seed, such as safflower seed or other oil-bearing seed as set forth below, to the dehydrated forage, or small grain or supplementary composition before grinding the product, the admixed oil-bearing seeds and the dehydrated forage, or small grain or supplementary composition, may be simultaneously ground in any suitable mill and to any desired degree of fineness, thus producing a ground meal which is characterized by the substantial absence of dust both during the grinding and in any subsequent handling or feeding. This oil-bearing seed may be blanched or not, although certain advantages, as will appear hereinafter, accrue when blanched seed is used.

My invention may be exemplified by the following:

A quantity of substantially dehydrated chopped alfalfa was charged to a conventional alfalfa grinding mill provided with an exhaust outlet and the alfalfa was continuously ground. During the grinding quantities of dust were in evidence in the atmosphere surrounding the mill itself, and appreciably visible quantities of dust were discharged from the exhaust outlet. The dust formed, computed as loss in the grinding of the alfalfa charged to the mill, was approximately 3% in the grinding operation. When whole safflower seed having an oil content of about 30% was added to the same dehydrated chopped but unground alfalfa in an amount corresponding to forty pounds of safflower seed per ton of alfalfa and the mixture of alfalfa and safflower were simultaneously ground, the dust formation decreased approximately 50%. When eighty pounds of safflower seed were added for each ton of the dehydrated but unground alfalfa charged to the mill the dust formation was suppressed practically entirely, no dust was visible in the vicinity of the mill and none was discharged from the exhaust stack. The safflower seed was continuously fed to the stream of alfalfa, just ahead of the grinding mill, from a suitable feeder such as a "Syntron" dry feeder. This dry feeder comprises a hopper, a trough leading therefrom, and vibrating means for the hopper and the trough. A conventional hammermill was found satisfactory for grinding or pulverizing the mixture, although other well known comminuting apparatus may be used. Depending on the particular hammermill or other pulverizing apparatus used, and the particular oil-bearing seed used, the rate of feed for the latter may vary from about 20 to about 400 pounds per hour, where the rate of feed of the dust-forming material ranges from 100 to 20,000 pounds per hour. The oil-bearing seed and the material in which dust control is desired may be thoroughly premixed, by either batch or continuous methods, prior to grinding. It is noted, however, that the grinding operation itself provides a thorough and even admixture, and homogeneously distributes the oil-bearing seed material, and oil expressed therefrom throughout said admixture. The weight of ground alfalfa, exclusive of the weight of added safflower seed, was substantially the same as the alfalfa charged to the mill, showing no loss of weight from dust formation. The ground meal so produced had a very smooth velvety appearance, was of very high nutritive value, could be sacked or stored in bulk and shipped in bulk without visible evidence of dust. This last quality is of importance because loss, from dust, in sacking and shipment frequently runs about 2% of the meal, resulting in an overall loss in grinding, sacking and shipment of 5% or more.

There are certain advantages arising from the use of safflower seed and dehydrated alfalfa which render this mixture especially suitable for grinding together as my preferred embodiment of this invention. Safflower seed varies somewhat depending upon the quality and variety of the individual seed but in general has properties as follows:

|  | Percent |
|---|---|
| Oil | 26 to 37 |
| Protein | 12 to 22 |
| Moisture | 5 to 10 |
| Hull | 35 to 52 |

The kernel is characterized by the ease with which the oil may be expressed after the hull is fractured and the hull is characterized by properties of being friable yet relatively tough. It is my belief that these and other characteristics of the hull assist the mechanical elements, in a ball mill or hammermill, in the physical grinding of the dehydrated alfalfa and that the hulls also assist, by their oil content and adding physical bulk to the alfalfa, in disseminating the oil throughout the alfalfa in the grinding mill. Safflower seed has another excellent quality in that approximately 75% of its oil content consists of linoleic acid which is known to have very high nutritional value for animals. Safflower protein is high in most of the major amino acids but has one deficiency; namely, lysine. Since this is a predominant amino acid in alfalfa protein the mixture of ground alfalfa meal and safflower seed is supplementary to a remarkable degree. It is my belief that the safflower content of the admixed feed formed by grinding alfalfa and safflower seed has the further desirable property of stabilizing by suppressing the normal deterioration of the carotene content of the alfalfa.

While I have referred to the illustrative admixing of safflower seed with dehydrated alfalfa as my preferred embodiment of this invention and have illustrated that embodiment with an admixture of eighty pounds of safflower seed per ton of dehydrated alfalfa there are certain variables and substitutions which are within the scope of this invention. In the illustrative example the safflower seed analyzed about 30% oil content, consequently when eighty pounds of the seed were added to a ton of alfalfa, twenty-four pounds of oil were added per ton of alfalfa resulting in 1.2% oil in the meal. When forty pounds of the seed, or twelve pounds of the oil, were added per ton of alfalfa the qualities of the ground alfalfa meal were greatly improved but the dust formation was not completely suppressed. An excellent practical rate of addition would be sixty pounds of seed per ton of alfalfa, when the safflower seed was 30% oil-bearing seed, and this would give an oil content in the finished product of .9 of 1%. At this time no standardized ratio of weight per bushel has been adopted for safflower seed but for practical purposes, a bushel may be considered to run about forty, or slightly more, pounds per bushel. Consequently, a practical ratio of admixture of safflower seed to dehydrated alfalfa is 1½ to 2 bushels of safflower seed per ton of alfalfa.

The foregoing figures may be increased or decreased depending upon the oil content of the safflower seed and also depending upon the dehydrated feed which it is desired to grind. With feeds other than alfalfa more or less safflower may be added per ton of dehydrated feed depending upon the tendency of the feed to "dust" or create dust in grinding and handling. Obviously, safflower seed may be added to any type of feed which it is desired to grind such as pea vines, soybean vines, fodder from corn or sorghum, sugar cane waste, clovers, lespedeza, various grasses, hays and the like. In addition to these dehydrated feeds of the type previously referred to as forage feeds there are certain small grains which, while known to have some oil or fat content, nonetheless do not have sufficient oil to be ground alone without creating dust generated in the grinding. Where such small grains, such as wheat, corn, oats, barley, milo maize and some grades of rice are to be ground, the addition of small amounts of safflower seed to the small grain prior to grinding will permit the grain to be ground without the formation of dust. This will also result in the formation of a meal which will have the added beneficial qualities of safflower seed, particularly desirous where the small grain is to be utilized for animal or poultry feed.

The desirable qualities of safflower seed discussed above are also found to a large extent in sunflower seed. This seed has a tough hull and the kernel has the quality of readily giving up the oil content thereof while the oil itself is present in desirably large amounts. Sunflower seed added to dehydrated alfalfa in quantities of from one to three percent of seed based on the alfalfa or other product charged to the grinding mill will be characterized by the absence of dust and the qualities of the composite meal, after grinding, in a manner closely similar to that found with respect to safflower seed. Of course, the castor oil bean is a source of readily expressible oil but since the oil has a high content of ricinoleic acid which is highly detrimental as a food the use of castor oil bean is not within the contemplation of this invention for grinding feed materials.

There are however, certain other oil-bearing seeds which are characterized by having a substantial oil or fat content which content may be expressed from the seed without too much difficulty which are within the contemplation of this invention. Thus, cottonseed, soybean seed, flaxseed, rapeseed, peanuts and the like may be added to dehydrated forage and simultaneously ground for the purpose of suppressing dust formation in the grinding while adding to the nutritive value of the ground meal. However, the quantity of available oil in cottonseed, soybean seed and peanuts is appreciably less than that which is both present in and expressible from sunflower and safflower seeds and consequently somewhat larger amounts of these alternative oil-bearing seeds should be added to accomplish the desired result. Whole olives, particularly where extremely plentiful or in oversupply, may be added to dehydrated forage and ground simultaneously therewith. When so used the olives, similar to safflower seed and sunflower seed, will be found to supply desired quantities of linoleic acid, while at the same time suppressing dust formation.

Where in this specification and claims the expression "oil-bearing seed" has been used it should be understood as defining a seed which has substantial quantities of readily expressible vegetable oil and wherein the oil is both edible and nutritive, and non-toxic. In general, seeds which have an oil content of more than 12 to 14% and seeds wherein the physical structure of the seed permits the oil to be expressed without resorting to excessive grinding or agitation will fall within the foregoing definition. For some seed materials, the oil content may be slightly below 12%, where the oil is readily expressed in the grinding operation. It is preferred, however, to utilize oil-bearing seeds which have 18% or more of oil content, and as stated above of the various seeds the three most highly preferred are safflower, sunflower, and flaxseed.

The foregoing concept of my invention has been discussed, and has been illustrated by, ground forage crops and products of vegetable origin wherein such crops or products are admixed with an oil-bearing seed and the mixture ground together whereby the oil is expressed from the seed in situ and distributed throughout the ground meal during the grinding. This, as emphasized above, not only suppresses dust formation and dust losses but adds to the resultant meal the beneficial and nutritive properties of the oil-bearing seed.

Oil-bearing seeds, particularly safflower and sunflower seeds may be added to dried materials of aninal or mineral origin the grinding of which involves dust formation and dust losses in grinding, handling and shipment. Thus, dried animal or poultry waste products intended for grinding to produce tankage, blood meal, green or steamed bone meal may be admixed with amounts of safflower or sunflower seed sufficient to supply the oil in dust-suppressing quantities and simultaneously ground to the required particle sizes. Similarly materials of mineral origin, intended as mineral supplements for consumption by animals or poultry, such as limestone, phosphate rock, and the like, and artificially prepared metallic salts of medicinal value, such as calcium lactate or calcium glucose and the like may be admixed with safflower seeds, sunflower seeds or other oil-bearing seeds and ground to the desired particle size with the aforesaid beneficial results.

In general a small amount, between about 2% and about 6% of whole safflower or sunflower seed having an oil content of 30% or more, and equivalent but slightly higher amounts of other oil-bearing seeds (which do not have the same degree of ease of oil expression), may be added to any material which is to be ground and which during the grinding produces dust. The grinding of the oil-bearing seed in situ reduces or eliminates the dust formation and leaves a small amount of oil relatively uniformly distributed in the ground product. I have observed in many instances that dust particles of such very small particle size as to be otherwise lost, tend to agglomerate with other dust particles or to adhere to larger particles due to the presence of the oil released in situ during the grinding by my process. To obtain my improved product, it is essential that the process of this invention be used. Thus, the product obtained by admixing previously ground normally dust-forming material and an oil-bearing seed meal prepared from oil-bearing seed does not result in a product having the same properties as the product of my invention. It is my belief that during the grinding in situ, a substantial proportion of the oil in the seeds is expressed, and instead of being substantially reabsorbed by the seed meal as would be the case where the seed is ground by itself, the oil forms a coating on the particles of dust and dust-forming material. When, however, the same amount of previously comminuted oil-containing seed meal and a ground, normally dust-forming material are admixed, the same quantity of oil is not taken up by the latter material, since the oil is not re-expressed from the seed meal by the relatively mild mechanical working necessary for mixing.

As indicated in the preceding paragraph, the amount of oil-bearing seed may be varied considerably. In general, I have found that satisfactory results are obtained by adding between about 2% and about 20% by weight of the oil-bearing seeds to the normally dust-forming material. The exact proportion depends on the materials used, of course. In this connection, the table set forth below shows approximate proportions by weight of some of the oil-bearing seeds, based on the weight of normally dust-forming solid material, which I have found to be suitable for adding, prior to grinding to a composite meal, to the following feed materials, for example: artificially dehydrated and suncured alfalfa, legumes, and forage feed, any feed grain, unjointed cereal grasses, and any feed mineral (such as phosphate rock and limestone), or any other feed material which normally forms dust during grinding and during handling thereafter.

| Item | Percent Approximate Oil Content | Percent Rates of Usage | Percent Approximate Oil Content End Product |
|---|---|---|---|
| Safflower Seed | 30 | 2–8 | .6–2.4 |
| Sunflower Seed | 26 | 2–10 | .5–2.6 |
| Mustard Seed | 35 | 2–6 | .7–2.1 |
| Flax Seed | 35 | 2–6 | .7–2.1 |
| Rape Seed | 40 | 2–5 | .8–2.0 |
| Cottonseed | 22 | 3–10 | .6–2.2 |
| Shelled Peanuts | 50 | 2–5 | 1–2.5 |
| Unshelled Peanuts | 30 | 2–8 | .6–2.4 |
| Sesame Seed | 50 | 2–5 | 1–2.5 |
| Soybeans | 18 | 2–10 | .3–1.8 |
| Any Oil-Bearing Seed | 12 or more | 2–20 | .3 or over |

The oil contents of these seeds are typical, although seeds of the same species may vary by several percent from these figures. The list of seed materials in the above table is not exhaustive, and others well known in the art may be used. For example kapok seed, teaseed, and whole olives have comparable available oil contents. There is an advantage in avoiding the additional step of pre-grinding the oil-bearing seeds and I prefer to utilize the whole seeds in performing my novel process and producing my novel product. However, in dealing with some seeds which have relatively hard shells or which have portions, such as the "germ," wherein the oil content is largely concentrated a pre-treatment to crack the seeds into unground particles or by which the seeds may be partially ground to separate and recover the "germ" may be used and is within the contemplation of my invention. Thus, in addition to whole seeds, other particulate oil-yielding seed materials having the proper available oil content may be utilized. Suitable seed materials falling within this latter class are materials containing the seed germ, and the oil carried therein, from cereal grains, such as corn germ and wheat germ, which seed germs or solid seed materials containing at least 12% oil are useful, notwithstanding the fact that the corresponding whole cereal seed contains only 2½ to 5% oil and is therefore not useful in my invention. For reasons of economy and for ease in feeding, however, unground oil-bearing seed is preferred. In any event, a grinding action severe enough to reduce the normally dust-forming material to a meal is also severe enough to express the oil from the oil-bearing material onto the particles of normally dust-forming material. Such result is not obtained by a mere mechanical mixing or by ordinary chopping, such as that used in preparing silage.

As indicated earlier, reference to dehydrated material herein includes material prepared by any method of drying, for example, sun-curing, shade-curing, drying by air currents as by fans, and/or drying by the application of artificial heat. The latter includes for instance radiant heat drying, hot air drying, and drying as by steam tubes or jacketed drums.

Other steps may be used and other materials may be added to the oil-bearing seeds or to the normally dust-forming material, prior to grinding. While I believe that the blanched or unblanched oil-bearing seed, such as safflower seed, used according to my invention, tends to diminish the loss of carotene in materials such as artificially dehydrated or sun-cured alfalfa during storage of the resulting composite meal, it has been found that other known materials may be used to advantage. Blanched safflower seed has the advantage that less browning of the stored alfalfa takes place than when unblanched seed is used. Where an antioxidant is used as an additional material, this has been added to steam blanched safflower seed before the latter is fed to alfalfa on its way to the grinder. A suitable antioxidant is "Santoquin" (6-ethoxy-2,2,4-trimethyl-1,2-dihydroquinoline), but others may be used as desirable.

I claim:

1. A process of grinding solid, normally dust-forming, material while reducing dust formation which comprises admixing a small amount of oil-bearing seed, having an oil content in excess of about 12%, with the material and thereafter grinding the mixture.

2. A process of grinding edible solid material while reducing dust formation which comprises admixing a small amount of edible oil-bearing seed, having an oil content in excess of about 12%, with the material and thereafter grinding the mixture.

3. A process of grinding feeds while reducing dust formation which comprises admixing between about 2% and about 6% by weight of an edible oil-bearing seed, having an oil content in excess of about 12%, with the feed and thereafter grinding the mixture to a meal.

4. A process of grinding dehydrated forage feeds while reducing dust formation which comprises admixing between about 2% and about 6% by weight of oil-bearing seeds from the group consisting of safflower seeds and sunflower seeds with the feed and thereafter grinding the mixture to a meal.

5. A process of grinding dehydrated legume feeds while reducing dust formation which comprises admixing between about 2% and about 6% by weight of oil-bearing seeds from the group consisting of safflower and sunflower seeds with the feed and thereafter grinding the mixture to a meal.

6. A process of claim 5 wherein the dehydrated legume feed is alfalfa.

7. The process of grinding dehydrated alfalfa while reducing dust formation which comprises adding whole safflower seed to the alfalfa in an amount between about 40 pounds to about 80 pounds per ton of alfalfa and grinding the mixture of alfalfa and safflower seed to a meal.

8. The process of grinding dehydrated alfalfa while reducing dust formation which comprises adding whole sunflower seed to the alfalfa in an amount between about 40 pounds to about 80 pounds per ton of alfalfa and grinding the mixture of alfalfa and sunflower seed to a meal.

9. A process of grinding supplemental feed material of mineral and animal origin while reducing dust formation which comprises admixing a small amount of an oil-bearing seed from the group consisting of safflower and sunflower seeds, with the unground feed material and thereafter grinding the mixture, thereby releasing and distributing the oil in situ during the grinding.

10. A process of grinding solid, normally dust-forming, material while reducing dust formation which comprises grinding together with said dust-forming material a small amount of a solid, oil-bearing seed material, having an oil content in excess of about 12%, whereby an admixture consisting of a composite meal is formed, the oil expressed from said seed material is homogeneously distributed throughout said admixture, and dust and fines normally lost during grinding and shipping are retained in the product.

11. The process of claim 10 in which the oil-bearing seed material utilized is whole seed.

12. The process of claim 10 in which the oil-bearing seed material utilized comprises the seed germ, and oil carried therein, of cereal grains.

References Cited in the file of this patent

UNITED STATES PATENTS

| | | |
|---|---|---|
| 59,255 | Otis | Oct. 30, 1866 |
| 85,313 | Kirk | Dec. 29, 1868 |

FOREIGN PATENTS

| | | |
|---|---|---|
| 457,603 | Great Britain | 1936 |